(12) United States Patent
Maibaum et al.

(10) Patent No.: US 10,571,035 B2
(45) Date of Patent: Feb. 25, 2020

(54) NON-RETURN VALVE (71) Applicant: ILLINOIS TOOL WORKS INC., Glenview, IL (US)

(72) Inventors: Mike Maibaum, Ludwigshafen (DE); Johannes Happich, Schifferstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 573 days.

(21) Appl. No.: 14/363,575

(22) PCT Filed: Nov. 30, 2012

(86) PCT No.: PCT/IB2012/002837
§ 371 (c)(1),
(2) Date: Jun. 6, 2014

(87) PCT Pub. No.: WO2013/084063
PCT Pub. Date: Jun. 13, 2013

(65) Prior Publication Data
US 2014/0345706 A1  Nov. 27, 2014

(30) Foreign Application Priority Data

Dec. 9, 2011  (DE) .......................... 10 2011 120 628

(51) Int. Cl.
*F16K 15/02* (2006.01)
*F16K 27/02* (2006.01)
(Continued)

(52) U.S. Cl.
CPC .......... *F16K 15/026* (2013.01); *F16K 15/044* (2013.01); *F16K 15/063* (2013.01);
(Continued)

(58) Field of Classification Search
CPC .... F16K 15/026; F16K 15/044; F16K 15/063; Y10T 137/7913; Y10T 137/7914;
(Continued)

(56) References Cited

U.S. PATENT DOCUMENTS 1,100,761 A * 6/1914 Mueller et al. ......... F16K 15/04
137/513.5
2,670,922 A * 3/1954 Carlisle ................. F16K 15/026
137/540
(Continued)

FOREIGN PATENT DOCUMENTS

CN     2118216 U    10/1992
EP     0559131 A1   9/1993
(Continued)

OTHER PUBLICATIONS

ISR and WO for PCT/IB2012/002837 mailed Apr. 4, 2013.

*Primary Examiner* — Marina A Tietjen
*Assistant Examiner* — Frederick D Soski
(74) *Attorney, Agent, or Firm* — Quarles & Brady LLP (57) ABSTRACT

The invention relates to a non-return valve with a valve sleeve, comprising a valve seat and a flow opening and a sealing body moveable in the valve sleeve, comprising a bulged sealing face, wherein the bulged sealing face is arranged at a head end of the sealing body and the non-return valve comprises guiding means for the axial guidance of the sealing body in the valve sleeve, so that the sealing face always faces the valve seat, and a locking element is inserted into the valve sleeve through the flow opening and is fixed therein, so that the locking element restricts the movement of the sealing body in the valve sleeve.

25 Claims, 11 Drawing Sheets

(51) Int. Cl.
*F16K 15/04* (2006.01)
*F16K 15/06* (2006.01)

(52) U.S. Cl.
CPC .... *Y10T 137/7847* (2015.04); *Y10T 137/7848* (2015.04); *Y10T 137/7913* (2015.04); *Y10T 137/7914* (2015.04); *Y10T 137/7921* (2015.04)

(58) Field of Classification Search
CPC ......... Y10T 137/7847; Y10T 137/7848; Y10T 137/7921
See application file for complete search history.

(56) References Cited

U.S. PATENT DOCUMENTS

| | | | |
|---|---|---|---|
| 2,941,629 A | 6/1960 | Rohacs | |
| 3,457,949 A * | 7/1969 | Coulter | F16K 15/026 137/516.27 |
| 3,559,678 A * | 2/1971 | Donner | F16K 15/044 137/535 |
| 4,784,177 A * | 11/1988 | Sepso | F25B 41/06 137/513.3 |
| 4,896,696 A * | 1/1990 | Bradley | F16L 55/027 137/513.3 |
| 5,092,361 A | 3/1992 | Masuyama et al. | |
| 6,427,711 B1 | 8/2002 | Kemp | |
| 7,296,594 B1 * | 11/2007 | Phanco | F16H 61/4017 137/512.2 |
| 2003/0196703 A1 | 10/2003 | DeCler et al. | |
| 2004/0062660 A1 | 4/2004 | Kazahaya et al. | |
| 2004/0074539 A1 * | 4/2004 | Weis | E03C 1/104 137/543 |
| 2004/0238043 A1 * | 12/2004 | Arnold | F04B 53/1027 137/543 |
| 2004/0261861 A1 * | 12/2004 | Fangmeier | E03C 1/104 137/540 |
| 2005/0178445 A1 * | 8/2005 | Gill | F25B 41/06 137/512 |
| 2006/0289068 A1 | 12/2006 | Miller, Jr. et al. | |
| 2007/0007194 A1 * | 1/2007 | Yoshida | B60K 1/00 210/359 |
| 2012/0160346 A1 * | 6/2012 | Shelcoviz | F16K 1/126 137/517 |
| 2013/0092864 A1 * | 4/2013 | Andersson | F16K 15/063 251/337 |

FOREIGN PATENT DOCUMENTS

| | | |
|---|---|---|
| EP | 1365150 A1 | 11/2003 |
| JP | 2001041332 A | 2/2001 |
| JP | 2005249154 A | 9/2005 |
| KR | 20080062665 A | 7/2008 |
| WO | 2008095953 A1 | 8/2008 |

* cited by examiner

NON-RETURN VALVE

RELATED APPLICATIONS

The present application is a National Phase of International Application Number PCT/IB2012/002837 filed Nov. 30, 2012 and claims priority of German Application Number 10 2011 120 628.4 filed Dec. 9, 2011.

BACKGROUND

The invention relates to a non-return valve with a valve sleeve comprising a valve seat and a flow opening and a sealing body moveable in the valve sleeve and comprising a bulged sealing face.

SUMMARY

It is known to use non-return valves for fluids or gases comprising a ball as sealing element in tubes for which the sealing ball is freely moveable within the valve body between a valve seat and an abutment. An abutment is commonly formed by a cylindrical pin which secures the sealing ball against dropping out of the valve body. The function of a non-return valve is to allow the flow of a medium in a flow direction and to stop it in the opposite direction. In the intended forward direction the sealing ball is for instance pressed out of the valve seat due to the pressure of the medium, so that the non-return valve opens and allows the passage of the medium through the valve body. If the medium flows in the sealing direction, the sealing ball is pressed into the sealing seat either by the flow pressure of the medium or by a restoring force, so that the valve closes and prevents the medium from passing through the valve body. The restoring force with which the sealing ball is pressed into the valve seat is for instance provided by a spring element which rests against the valve body.

A major disadvantage of non-return valves of the type mentioned is the wear of the sealing surface of the sealing ball through free rotation and turbulent swirling of the ball when the medium passes through the valve body. In particular this can lead to an unsymmetrical wear of the sealing surface and so to a crooked seat of the sealing ball in the valve seat. Consequentially, this leads to an undesired leakage of the valve. As another disadvantage, contaminations or bio films settle on the sealing face for example caused by particle-loaded flow media or long down time periods, leading to a crooked seat of the sealing face in the valve seat when the sealing ball rotates and thus also leading to an undesired leakage of the valve.

As another disadvantage a substantial part of the energy of the flowing medium is converted into kinetic energy of the sealing ball and heat for this type of non-return valves due to the rotation and the turbulent swirling of the sealing ball in the valve body. Therefore, additional pumping energy has to be dedicated for the propulsion of the medium.

The underlying problem of the invention is to provide a non-return valve of the above mentioned type which has little wear, an improved sealing effect and improved flow characteristics.

This problem is solved by the subject-matter of claim 1 of the invention. Advantageous embodiments are given in the dependent claims, in the description and in the figures.

According to the invention, a non-return valve is provided with a valve sleeve, comprising a valve seat and a flow opening and a sealing body moveable in the valve sleeve, comprising a bulged sealing face wherein the bulged sealing face is arranged at a head end of the sealing body and the non-return valve comprises guiding means for the axial guidance of the sealing body in the valve sleeve, so that the sealing face always faces the valve seat, and a locking element being inserted into the valve sleeve through the flow opening and fixed therein, so that the locking element restricts the movement of the sealing body in the valve sleeve.

Due to the curved sealing face at the head end of the sealing body the flow of the medium around the sealing body is particularly improved. With a so formed sealing face particularly little flow energy is drawn from the flowing medium.

In another aspect a particularly good sealing fit of the sealing body in the valve seat can be realized with such a curved sealing face. It is also conceivable that parts of the sealing face or the head end of the sealing body are formed conical or pointed. Without restricting the sealing effect, the sealing face may be flat in area parts. The sealing face is at least so formed that in a closed position of the valve the sealing face cooperates with the valve seat so that the valve shuts off the passage of the medium through the valve body. In particular the sealing face may also be shaped so that only the portion cooperating with the valve seat has a curvature. A curved form also has the advantage that the sealing face can also be sealingly pressed into the valve seat of the sealing body slightly tilted. The sealing face can be formed hemispherical or partially hemispherical in particular.

The guiding means for the axial guidance of the sealing body ensure that the sealing face at all time faces the valve seat. For an axial guidance, the sealing body is guided within the valve sleeve in particular in the direction of its longitudinal axis. The longitudinal axis of the sealing body is thus always aligned substantially parallel to the longitudinal axis of the valve sleeve. A substantially parallel alignment of the longitudinal axis means that the guiding means are designed in such a manner that a tilting of the sealing body in the valve sleeve is fully or mostly prevented. This has the advantageous effect that the sealing face does not rub against the inner walls of the valve sleeve during its movement within the valve body. Therefore the wear on the sealing face is significantly reduced during the service life of the non-return valve.

The guiding means have the further effect that the rotation and turbulent swirling of the sealing body in the flowing medium is prevented and thus flowing energy is conserved. In comparison to a sealing body formed as a ball, the sealing body according to the invention is particularly formed, so that a substantially improved flow of the medium through the non-return valve is provided. This can be achieved for instance through grooves and ridges arranged on the outer wall of the sealing body aligned in the flowing direction of the medium.

In a preferred embodiment the non-return valve comprises a spring element which exerts a force on the sealing body, so that the sealing body is pressed into the valve seat. Preferably the spring element is supported on the locking element.

Further preferably the locking element is ring-shaped. The locking element can also be formed of a bracing of strut elements, which are, for example, arranged star-like and centrally connected. In particular the locking element has a peripheral form which is complementary to the shape of the flow opening of the non-return valve. The ring element has at least one recess through which the medium can flow. The recess can in particular be the opening which is limited by the ring-shape. By the choice of the cross-section of the recess and the cross-sectional area, the flow characteristics of the non-return valve can be adjusted.

For the attachment of the locking element within the valve sleeve it is inserted hereinto from the outside. During the insertion, the locking element is elastically deformed. The locking element may be held in the valve sleeve by means of a snap connection, meaning it can in particular be clipped into a groove within the valve sleeve. The groove for receiving the locking element may be circumferentially embedded into the inner wall of the valve sleeve. Instead of the groove also fastening ridges may be provided projecting on the inner wall forming a circumferential latching channel. To hold the locking element in the valve sleeve also mounting projections may be provided arranged at the inner side of the valve sleeve. Alternatively it is, for example, also possible that the locking element is held in the valve sleeve by a welding connection, for example a friction or ultrasonic welding connection or by an adhesive connection.

In one embodiment the sealing body comprises wing-like ribs at its outer side distributed in circumferential direction. In particular the ribs may be formed as oblong projections which are circumferentially distributed and in longitudinal direction arranged on the sealing body and projecting radially outward with respect to the longitudinal axis of the sealing body. In particular three oblong ribs may be arranged on the sealing body evenly distributed over its circumference. In a first way the ribs lead to an optimized guidance of the medium flowing around the sealing body. In a double function the ribs may be provided as spacer elements, so that the sealing body is held in a centered position in the valve sleeve. Additionally, the ribs may be formed such that the sealing body is supported against an inner wall of the valve sleeve and is guided within the valve sleeve in its longitudinal direction.

In another embodiment the guiding means comprises the wing-like ribs, wherein the ribs lie against the inner wall of the valve sleeve such that the sealing body is guided in its movement in axial direction. The inner wall of the valve sleeve is then also part of the guiding means.

According to another embodiment, guiding grooves are arranged on the inner wall of the valve sleeve in which the wing-like ribs are guided. The guiding grooves secure the sealing body against rotation about its axis during its movement in the valve sleeve. Thus the guiding grooves provide a twist protection. This guidance also leads to a stabilization of the sealing body and in particular may prevent flow induced flatter of the sealing body.

Preferably, the sealing body comprises a cylindrical cavity, which has an opening at a foot end of the sealing body. The cavity may in particular have a circular cylindrical shape. Alternatively, the cavity may have a rectangular or triangular peripheral shape. Other alternative embodiments are also conceivable.

In another embodiment the locking element comprises a cylindrical guiding element which extends in its axial direction into the cavity of the sealing body. The guiding element extends into the cavity of the sealing body such that the longitudinal axis of the guiding element and the cavity are aligned parallel and/or congruent to one another. The guiding element may be formed complementary to the cavity. In particular the guiding element may have the shape of a hollow cylinder.

In one embodiment the guiding means include the guiding element and the cylindrical cavity of the sealing body, wherein the inner side of the cavity lies against the outer side of the guiding element, such that the sealing body is guided about its movement along the guiding element in axial direction. It is also conceivable that protrusions, ridges or grooves are arranged on the inner side of the cavity and/or on the outer side of the guiding element through which the sealing body is guided along the guiding element.

The guiding element may be provided with one or more pressure equalization openings which allow pressure equalization within the guiding element. Pressure equalization is particularly necessary if the guiding element is fitted precisely into the cavity of the sealing body and the sealing body moves in the valve sleeve.

Preferably, a spring element is arranged within the guiding element which supports the sealing body against the locking element and exerts a force on the sealing body which presses the sealing face into the valve seat. The spring element may in particular be a spiral spring. Since the spring element is arranged in the guiding element which extends into the cavity, the medium flowing through the non-return valve does not flow along the spring element. This leads to a considerable reduction of corrosion and wear of the spring which may be caused by abrasive or corrosive media.

Further preferred, the sealing body comprises at least one passage opening such that in the closed state of the non-return valve gases or fluids can flow through the passage opening. The passage opening, for example in form of an axial through hole, is preferably arranged in the sealing face. By the axial guidance of the sealing body within the valve sleeve the sealing face is always facing the valve seat. This ensures that in case of a closed non-return valve the medium can always flow through the passage opening in the blocking direction of the non-return valve. Therefore, a misalignment of the sealing body with respect to the valve seat which would prevent a reverse flow of the medium through the passage opening can be prevented by the axial guidance.

In one embodiment the valve sleeve, the sealing body and the locking element are made of the same material. This has the advantage of a reduced wear of the sealing body during its movement in the valve sleeve. By using one single material for the components of the non-return valve also the costs for production of the non-return valve can be reduced.

In a further preferred embodiment the valve sleeve, the sealing body and the locking element are manufactured by injection molding. This manufacturing method ensures a fast, cost-effective and at the same time a high-precision production of the non-return valve.

Preferably, the flow opening of the valve sleeve comprises a flow surface, wherein the flow surface is arranged in flow direction axially behind the valve seat and the opening cross-section of the flow opening along the flow surface steadily increases in the flow direction. The flow surface may in particular have an S-shaped profile. It is also conceivable that the flow surface may have a fully or partially conical or cone-like form. This design leads to an improvement of the flow characteristics of the flow opening of the valve sleeve. The flow surface allows a laminar flow of the medium along the inner surfaces of the valve sleeve. Pressure losses can be avoided.

In another preferred embodiment a dome-shaped bulge is arranged at the foot end of the sealing body. Additionally or alternatively this bulge may be tapered. For example a conical or cone-shaped form is conceivable. With an end section of this type flow separation can be prevented behind the sealing body. It is particularly advantageous that turbulences can be prevented in the non-return valve through this flow adapted form. The dome-shaped end section may further have laterally disposed recesses for example for saving material or weight.

According to a preferred embodiment, the locking element comprises a collar-like projection which extends on one side of the locking element in axial direction. Preferably, the projection is interrupted by recesses which are evenly distributed over its circumference. Edges which are formed by the locking element within the valve-sleeve can be avoided by the collar-like projection and thus a better flow through the valve sleeve can be obtained. For the improved flow guidance the projections may be rounded. Also a conical or ramp-shaped profile of the projections is conceivable.

Preferably, the locking element has an increased area or increased material thickness in the region of its annular opening. This allows on the one hand an improved power transmission to the locking element upon insertion of the same in the valve sleeve. On the other hand also the insertion of the valve sleeve with the inserted locking element into a hose or pipe is easier through the improved power transmission and an increased tool engaging surface. The increased area is preferably a closed annular surface, which extends from the outer periphery of the locking element radially inwards.

The invention also relates to a tubing for an automobile, wherein a non-return valve according to the invention is pressed into the tubing. The tubing can in particular be a rigid or flexible plastic or metal pipe. The tubing may, however, also be a flexible hose.

BRIEF DESCRIPTION OF THE DRAWINGS

Embodiments of the invention are explained below with reference to the Figures. Shown are:

FIG. 1a a first perspective view of a sealing body of a non-return valve according to the invention according to a first embodiment, FIG. 1b a second perspective view of the sealing body from FIG. 1a, FIG. 1c a third perspective view of the sealing body from FIG. 1a, FIG. 2a a first plan view of a valve sleeve of a non-return valve according to the invention in the forward direction, FIG. 2b a second plan view of the valve sleeve from FIG. 2a opposite to the forward direction, FIG. 3a a first sectional view of the valve sleeve from FIG. 2a, FIG. 3b a second sectional view of the valve sleeve from FIG. 2a, FIG. 4a a perspective view of a locking element of a non-return valve according to the invention according to a first embodiment, FIG. 4b a plan view on the valve sleeve from FIG. 2a with an inserted locking element opposite to the forward direction, FIG. 5a a sectional view of the valve sleeve from FIG. 2a with an inserted sealing body, FIG. 5b a side view of the valve sleeve from FIG. 2a, FIG. 6a a first perspective view of a sealing body of a non-return valve according to the invention according to a second embodiment, FIG. 6b a second perspective view of the sealing body from FIG. 6a, FIG. 7a a first perspective view of a locking element of a non-return valve according to the invention according to a second embodiment, FIG. 7b a second perspective of the locking element from FIG. 7a, FIG. 7c a plan view on the valve sleeve from FIG. 2a with an inserted locking element opposite to the forward direction, FIG. 8 a sectional view of the valve sleeve from FIG. 2a with an inserted locking element, FIG. 9a a perspective view of the valve sleeve from FIG. 2a and FIG. 9b a perspective view of the valve sleeve from FIG. 2a, FIG. 10a a sectional view of the valve sleeve from FIG. 2a, FIG. 10b a perspective view of the valve sleeve from FIG. 2a, FIG. 10c a plan view on the valve sleeve from FIG. 2a in axial direction opposite to the forward direction, FIG. 11 a perspective view of the sealing body from FIG. 1a, FIG. 12a a perspective view of the locking element from FIG. 4a, FIG. 12b a plan view on the locking element from FIG. 12a.

DETAILED DESCRIPTION OF THE DRAWINGS

Figure 1A:
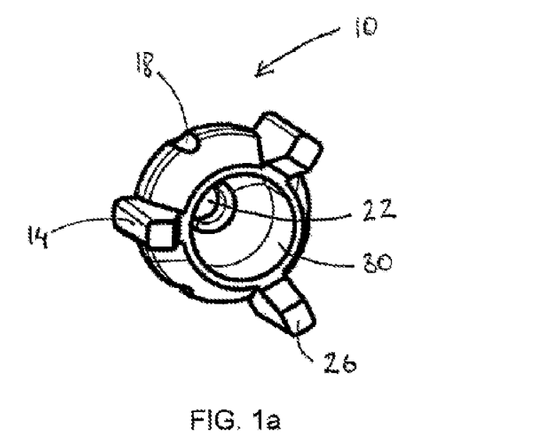
Figure 1B:
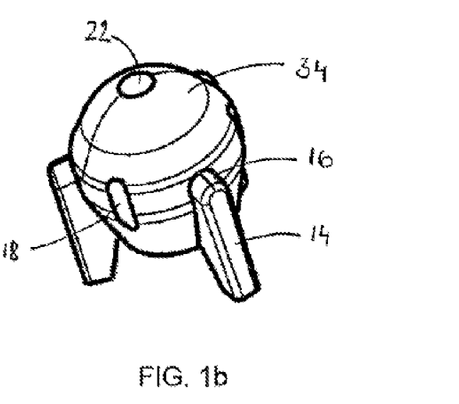
Figure 1C:
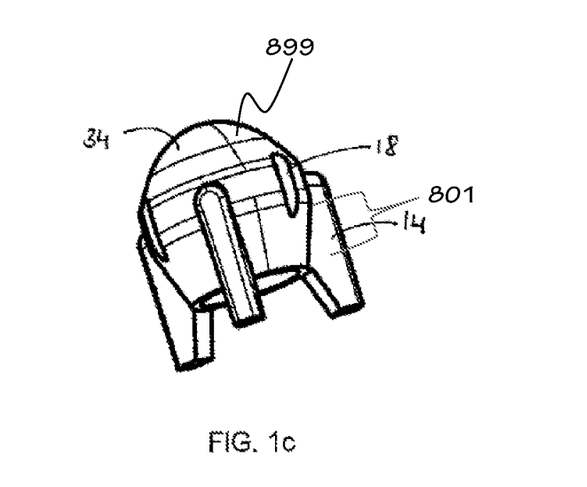

The sealing body 10 in FIGS. 1a-c has a drop-shaped portion. A semicircular sealing face 34 is arranged at the head end of the sealing body 10. A circular cylindrical cavity 30 is formed centrally in the sealing body 10 oriented along its longitudinal direction, limited by the sealing face 34 at the head end and opening into a circular opening at the foot end of the sealing body 10, the opening corresponding to the cross section of the cavity 30. A leak passage 22 in the form of a through hole is arranged centrally in the sealing face and extends in the longitudinal direction of the sealing body 10 into the cavity 30. Flow grooves 18 are arranged on the sealing body 10 oriented in its longitudinal direction, distributed over its circumference. Between the flow grooves 18 guide wings 14 are arranged over the circumference of the sealing body 10. Rounded wing shoulders 16 are formed at the upper end of the guiding wings 14.

Figure 2A:
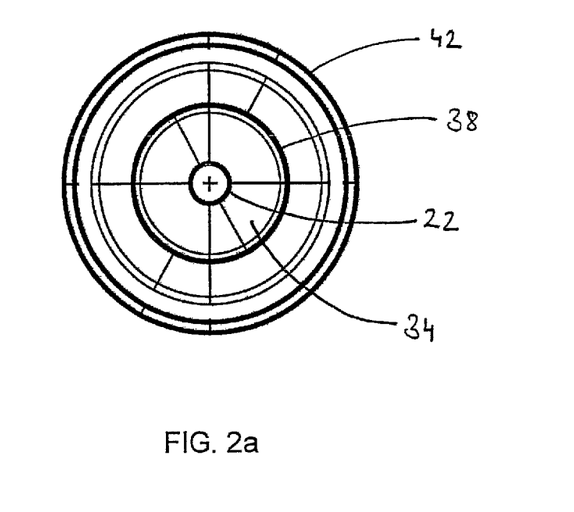

The valve sleeve 42 in FIG. 2a has a circular cylindrical peripheral shape. A sealing body 10 is inserted into the valve sleeve. The sealing face 34 rests in the valve seat 38. A bore 22 is arranged centrally in the sealing face 34.

Figure 2B:
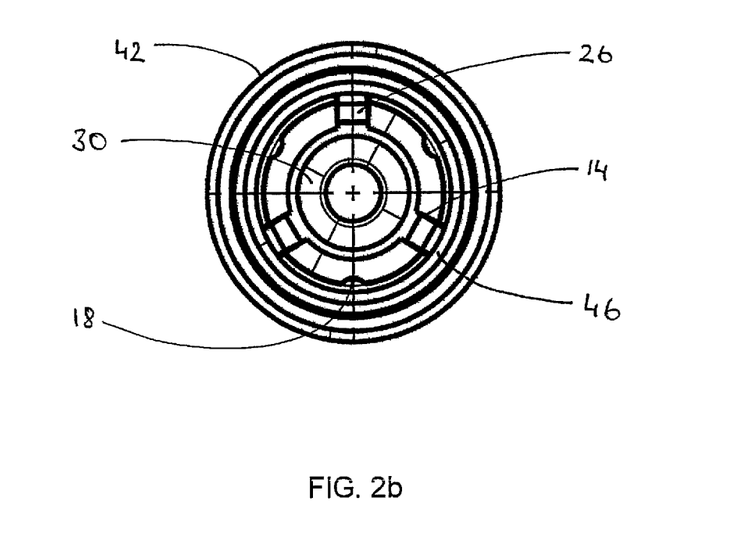

In the valve sleeve in FIG. 2b a sealing body 10 is inserted. At the foot end of the sealing body 10 a locking element 46 is pressed into the sleeve. The sealing body stands on the locking element with its feet 26.

Figure 3A:
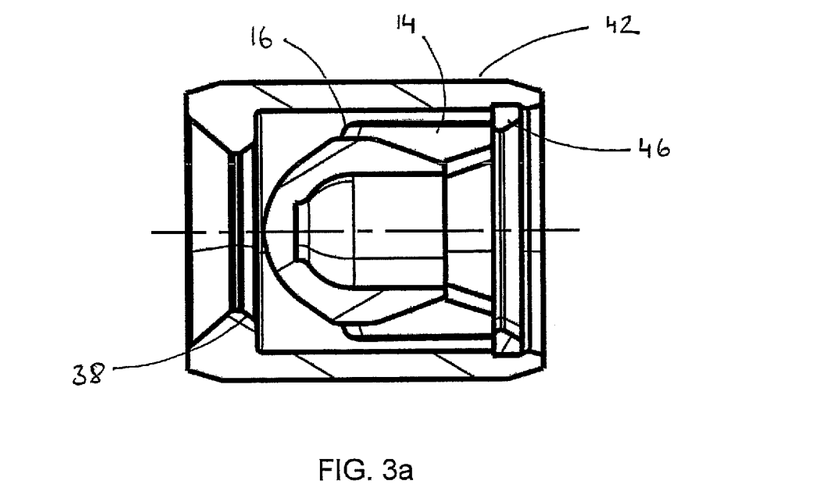
Figure 3B:
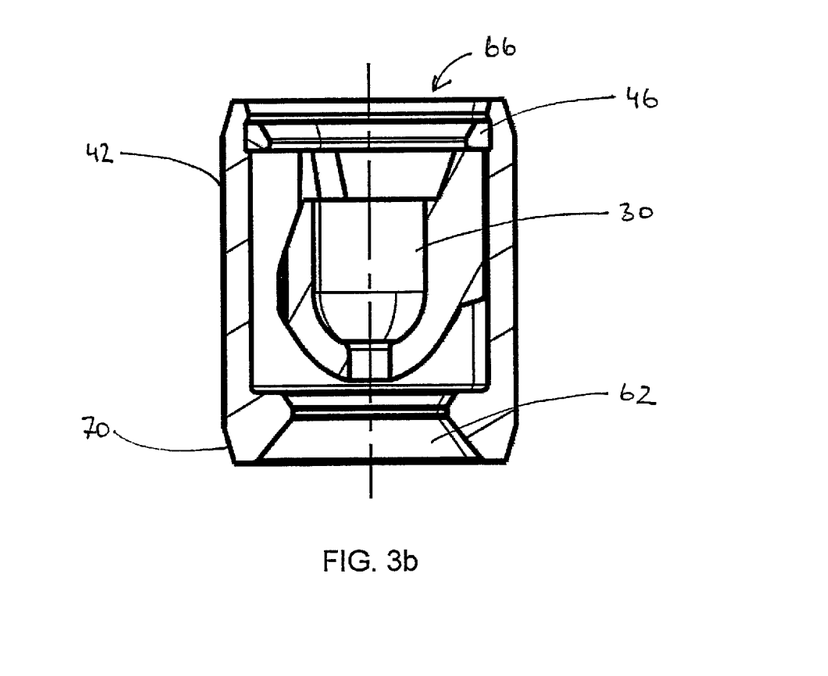

The non-return valve according to the invention in FIGS. 3a and 3b is shown in an open position. The sealing body 10 stands on the locking element 46 with its feet 26. The space between the valve seat 38 and the sealing face 34 forms an opening of the non-return valve.

Figure 4A:
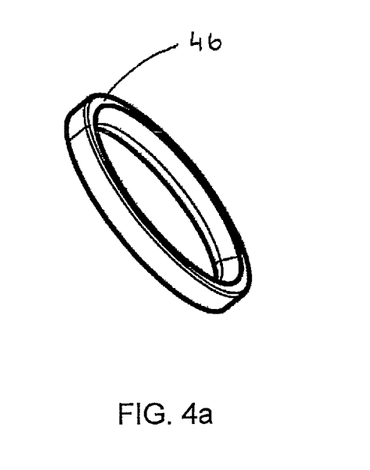
Figure 4B:
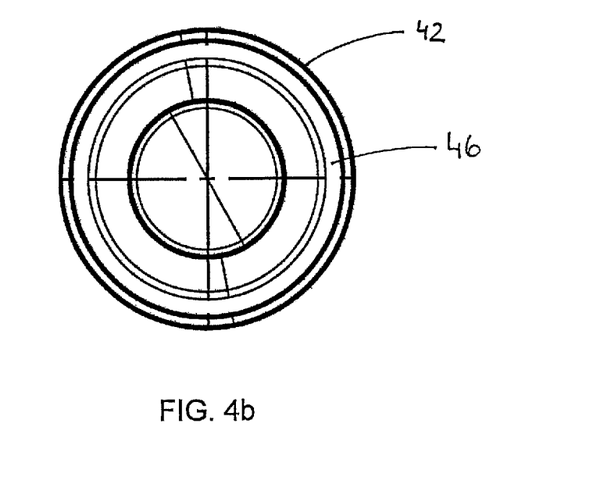

FIG. 4a shows a locking element 46 in a ring-shaped design. FIG. 4b shows the locking element 46 from FIG. 4a in a clipped-in position.

Figure 5A:
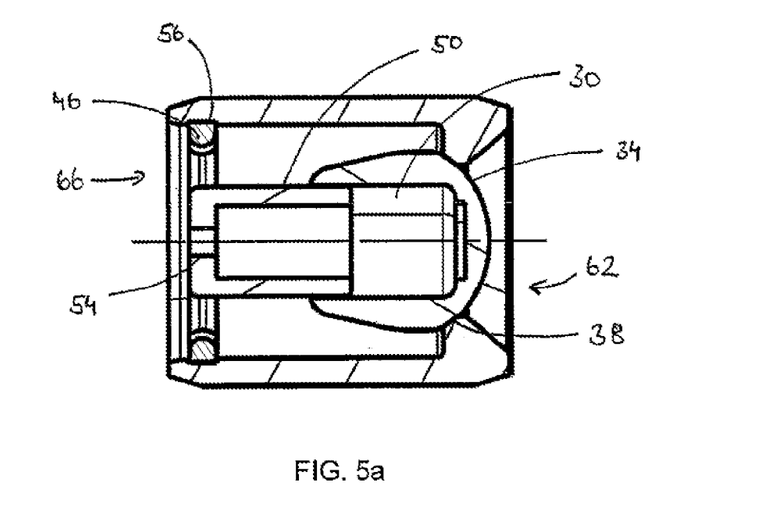
Figure 5B:
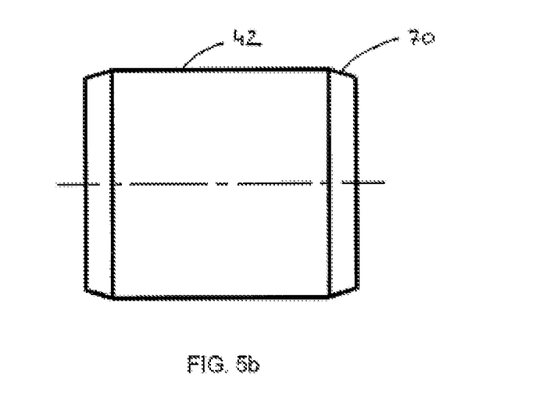

In FIG. 5a the non-return valve according to the invention is shown in a closed position. The sealing body 10 comprises a circular cylindrical cavity 30. The valve input 62 is located at a first end of the non-return valve. The valve outlet 66 is located at the opposite end. At the valve outlet 66 the inserted locking element 46 is clipped into an undercut 56 at the inner wall of the valve sleeve 42. A hollow cylindrical guiding element 50 which extends into the cavity 30 is arranged centrally at the locking element 46. The sealing face 34 is pressed into the valve seat 38 and thus seals the valve inlet 62. FIG. 5b shows a valve seat 42 in a side view.

In the area of the valve inlet 62 and outlet 66 slanted pressing surfaces are arranged at the outer edges of the valve sleeve 42. The pressing surfaces 70 facilitate the insertion of the non-return valve into a tube or hose.

Figure 6A:
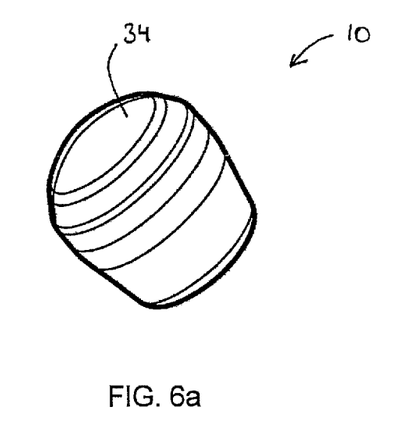
Figure 6B:
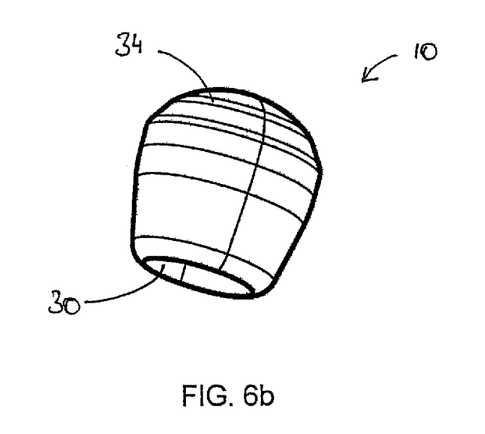
Figure 7A:
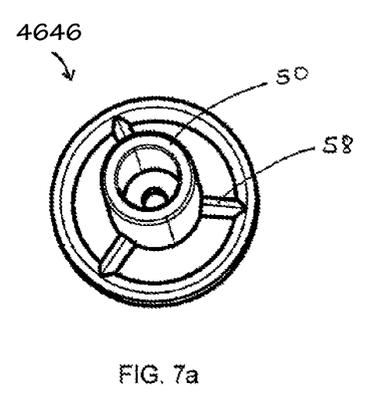
Figure 7B:
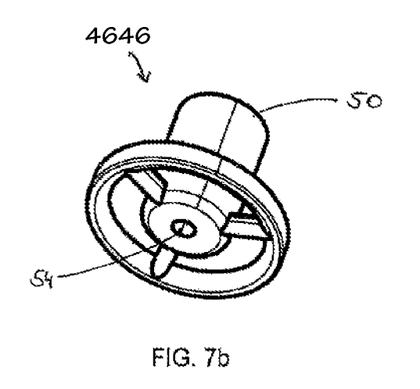
Figure 7C:
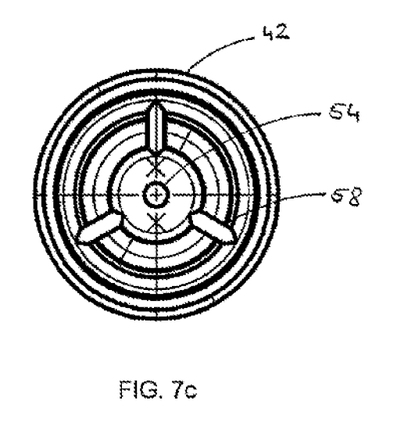

FIGS. 6a and 6b show an axially symmetrical sealing body 10 with a plug-shaped body. The sealing face 34 at the head end of the sealing body 10 is curved hemispherical. Behind the sealing face 34 the shell surface of the sealing body 10 tapers approximately conically in the direction its foot end. The sealing body is shaped flow optimized. FIGS. 7a and 7b show a perspective view of a locking element 4646. FIG. 7c shows the locking element 4646 from FIGS. 7a and 7b in a valve sleeve 42 in a clipped-in condition. A pressure equalization opening 54 is embedded into the bottom of the guiding element 50. Holding struts 58 hold the guiding element 50 in the center of the bottom portion of the ring-shaped locking element 4646. The retaining struts 58 extend like spokes from the guiding element 50 radially outward.

Figure 8:
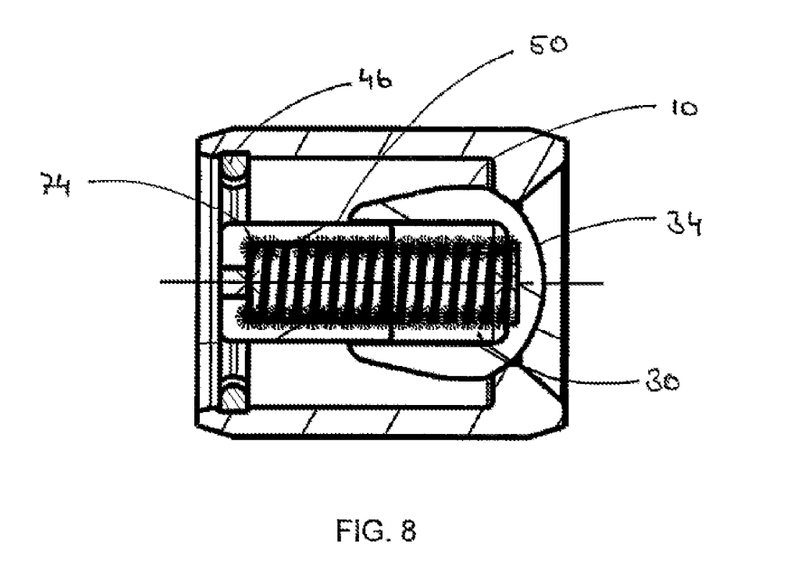

FIG. 8 shows the valve sleeve 42 from FIG. 2a in a sectional view with a sealing body 10 from FIGS. 6a and 6b. A spring 74 is deployed in the cavity of the guiding element 50, extending in axial direction into the cavity 30 of the sealing body 10. The spring is supported on the locking element 46 and presses the sealing body 10 including the sealing face 34 into the valve seat 38.

Figure 9A:
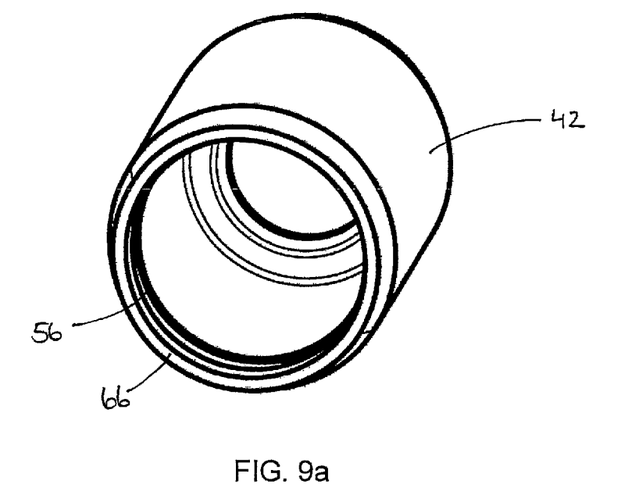
Figure 9B:
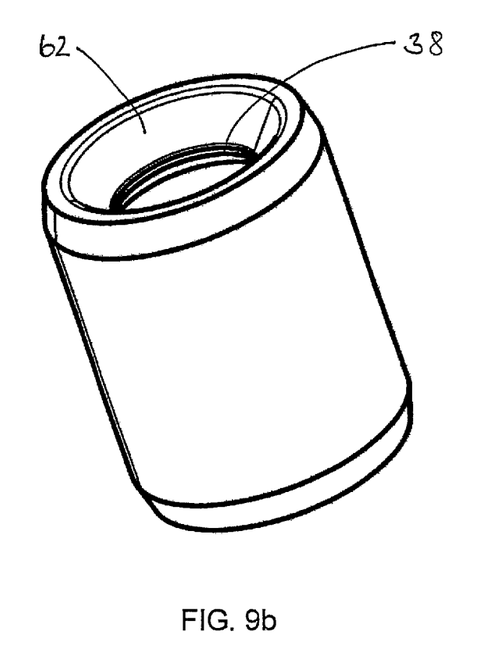

FIGS. 9a and 9b show the valve sleeve 42 from FIG. 2a in a perspective view without the sealing body and the locking element. A tapered surface is formed at the valve inlet 62 with which the flowing medium can be guided into the non-return valve.

Figure 10A:
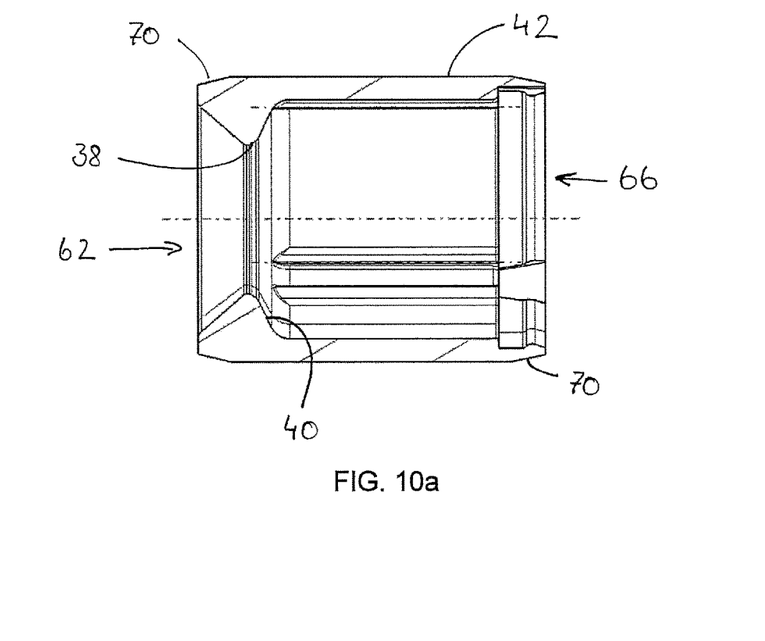
Figure 10B:
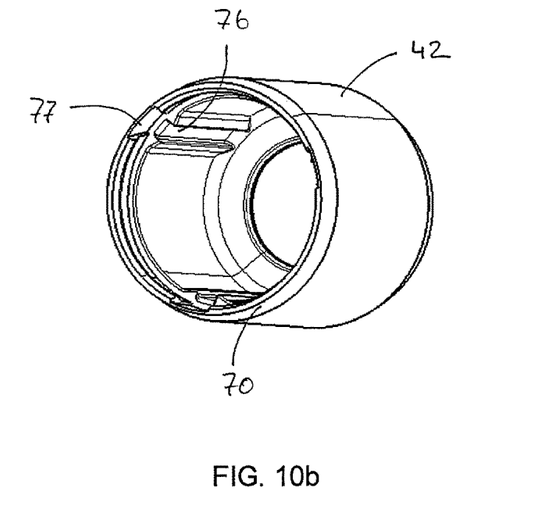
Figure 10C:
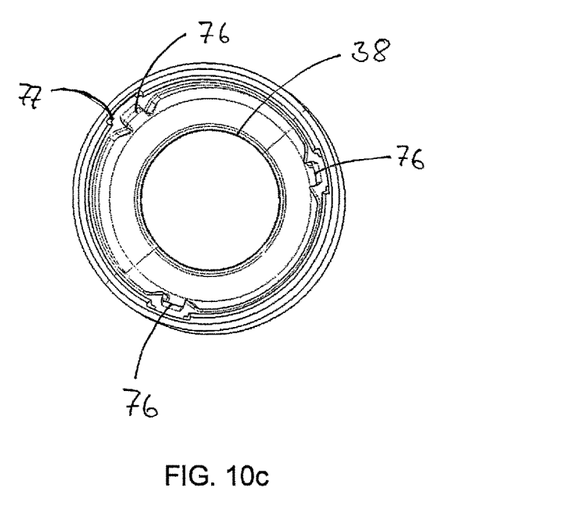

FIGS. 10a to 10c show the valve sleeve 42 from FIGS. 2a to 3b. FIG. 10a shows the valve sleeve 42 in a sectional view from the side. In contrast to the valve sleeve 42 from FIGS. 2a to 3b a flow surface 40 is formed in the flow opening. Along the flow surface 40 the cross section of the flow opening increases in a section axially behind the valve seat 38 towards the foot end of the valve sleeve 42. The contour of the flow surface 40 is slightly curved, so that smooth transitions are formed from the valve seat 38 to the inner wall of the valve sleeve 42. The flow opening has improved flow characteristics.

FIGS. 10b and 10c show the valve sleeve 42 in a perspective view and in a plan view in axial direction. The valve sleeve 42 comprises three guiding grooves 76 which are evenly distributed about the circumference of the valve sleeve 42 and extend in a straight line in axial direction on its inner wall. The guiding grooves 76 are each formed and enclosed by two oblong ridges extending in a straight line in axial direction on the inner wall of the valve sleeve 42.

Three guiding notches 77 are formed at the foot end of the valve sleeve in alignment with the guiding grooves 76. The guiding notches 77 correspond to guiding tongues 84 of the locking element 46 shown in FIG. 12a. The guiding notches 77 and the guiding tongues 84 are utilized for the alignment of the locking element 46 when it is inserted into the valve sleeve 42.

Figure 11:
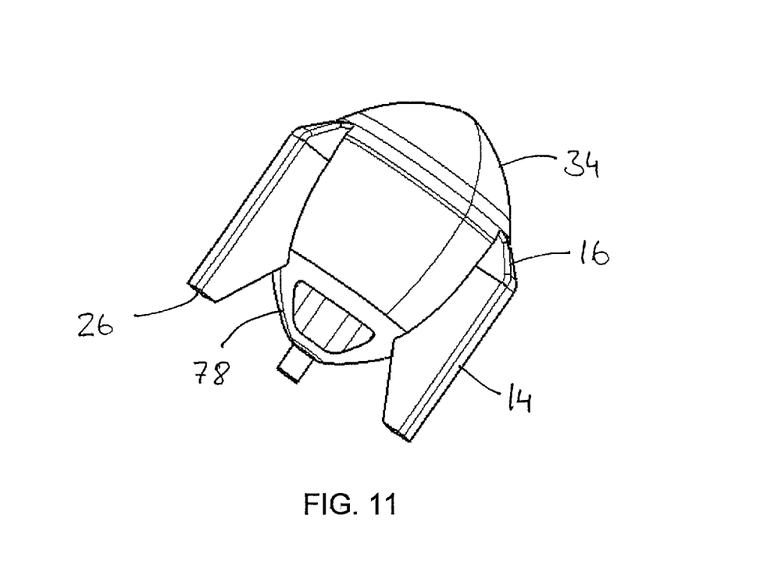

FIG. 11 shows the sealing body 10 from FIGS. 1a to 1c without flow grooves 18 and without passage openings 22. At its foot end the sealing body 10 is in the further provided with a dome-shaped bulge 78. The wing shoulders 16 of the guiding wings 14 extend approximately obliquely tapered towards the outer shell surface of the sealing body 10. By the approximately slanted shape of the shoulders 16 and the dome-shaped bulge 78, respectively, the sealing body 10 has flow-optimized characteristics.

Figure 12A:
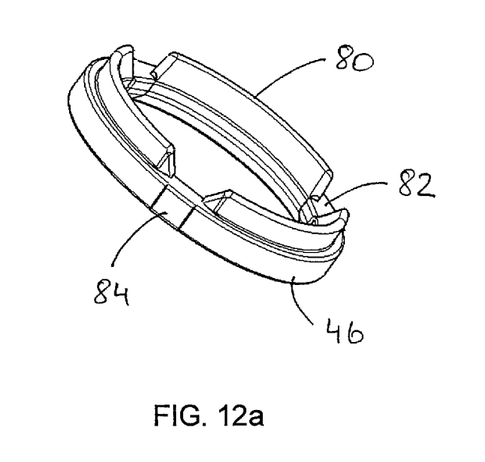
Figure 12B:
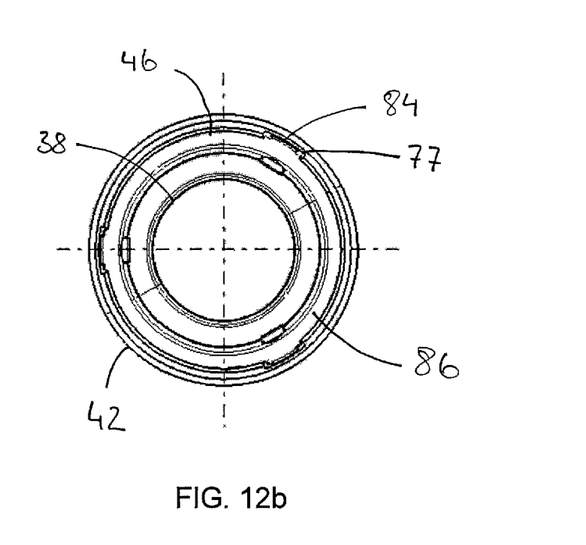

FIGS. 12a and 12b show the locking element 46 of FIG. 4a. The locking element 46 is further provided with a circumferentially arranged collar-like projection 80 which extends at one side of the locking element 46 in axial direction. The collar-like projection 80 is interrupted by three recesses 82 evenly distributed in circumferential direction. Three guiding tongues 84 are arranged at the outer peripheral surface of the locking element, which are aligned with the recesses 82 when the locking element 46 is inserted in the valve sleeve 42. The sealing body 10 is adapted to stand in the recesses 82 with its feet 26. At 86 a closed annular surface of the locking element 46 is shown extending from the outer periphery of the locking element radially inwards.

The invention claimed is:

1. A non-return valve comprising:
   a valve sleeve;
   a valve seat;
   a flow opening; and
   a sealing body moveable in the valve sleeve, the sealing body comprising:
      a dome-shaped portion having an outer surface defining a bulged sealing face, the dome-shaped portion having a maximum cross-sectional diameter at a base region of the dome-shaped portion; and
      a truncated conical-shaped portion having a first end and a second end between the dome shaped portion and the first end, the second end having a cross-sectional diameter less than or equal to the maximum cross-sectional diameter of the dome-shaped portion, and the first end having a cross-sectional diameter less than the second end,
   wherein the bulged sealing face is arranged at a head end of the sealing body and the non-return valve further comprises a guiding means for the axial guidance of the sealing body in the valve sleeve, so that the bulged sealing face always faces the valve seat, a locking element inserted into the valve sleeve through the flow opening and is fixed therein, so that the locking element restricts the movement of the sealing body in the valve sleeve, and the locking element is retained in the valve sleeve by means of a snap connection, and
   wherein the locking element includes at least three recesses facing the sealing body, the at least three recesses having respective bottom floors and sides extending from the floors established by structure of the locking element.

2. The non-return valve according to claim 1, wherein the first end of the truncated conical-shaped portion defines an opening of a cavity within the sealing body.

3. The non-return valve according to claim 2, wherein a diameter of the cavity within the sealing body is uniform throughout the truncated conical-shaped portion of the sealing body and tapered within the dome-shaped portion of the sealing body.

4. The non-return valve according to claim 1, wherein the sealing body comprises a cylindrical cavity, which has an opening at a foot end of the sealing body.

5. The non-return valve according to claim 1, wherein the sealing body comprises swept wings located at least substantially equidistant from each other about a longitudinal axis of the sealing body, the wings establishing the guiding means.

6. The non-return valve according to claim 1, wherein the sealing body has wings extending in a longitudinal axis of the sealing body beyond the second end of the truncated conical-shaped portion, the wings establishing the guiding means, and wherein the second end is the end of the sealing body, and the only moving part of the non-return valve that extends beyond the second end are the wings.

7. The non-return valve according to claim 1, wherein the valve is configured such that the means for guiding comes into direct contact with the locking element when restricting movement of the sealing body in the valve sleeve, the restricting of movement being movement of the sealing body in the axial direction, wherein when the valve is closed, the means for guiding is away from the locking element.

8. The non-return valve according to claim 1, wherein the truncated conical-shaped portion extends in a direction away from the dome-shaped portion such that the first end of the truncated conical-shaped portion is external to an interior of the dome-shaped portion.

9. The non-return valve according to claim 1, wherein the valve seat is contoured to the dome-shaped portion.

10. The non-return valve according to claim 1, wherein the valve seat has a contoured portion that is contoured to the dome-shaped portion, and the valve sleeve, of which the valve seat is apart, has a wall that extends normal away from a longitudinal axis of the sealing body from the contoured portion to a sidewall of the valve sleeve.

11. The non-return valve according to claim 1, wherein the sealing body is unbiased within the valve sleeve.

12. A device, comprising:
a non-return valve including
a valve sleeve,
a valve seat,
a flow opening, and
a sealing body moveable in the valve sleeve, the sealing body comprising:
a dome-shaped portion having an outer surface defining a bulged sealing face, the dome-shaped portion having a maximum cross-sectional diameter at a base region of the dome-shaped portion; and
a truncated conical-shaped portion having a first end and a second end between the dome shaped portion and the first end, the second end having a cross-sectional diameter less than or equal to the maximum cross-sectional diameter of the dome-shaped portion, and the first end having a cross-sectional diameter less than the second end, wherein
the bulged sealing face is arranged at a head end of the sealing body,
the non-return valve comprises guiding means for the axial guidance of the sealing body in the valve sleeve, so that the bulged sealing face always faces the valve seat, and
the a locking element inserted into the valve sleeve through the flow opening and is fixed therein, so that the locking element restricts the movement of the sealing body in the valve sleeve, wherein the sealing body comprises a plurality of wings arrayed about a longitudinal axis of the sealing body, the wings establishing the guiding means, the wings having a leading edge and a trailing edge, the trailing edge extending away from the first end of the truncated conical shaped portion and away from the longitudinal axis.

13. The non-return valve according to claim 12, wherein the first end of the truncated conical-shaped portion has a sidewall defining an opening of a cavity within the sealing body.

14. The non-return valve according to claim 13, wherein a diameter of the cavity within the sealing body is uniform throughout the truncated conical-shaped portion of the sealing body and tapered within the dome-shaped portion of the sealing body.

15. The non-return valve according to claim 12, wherein the truncated conical-shaped portion extends in a direction away from the dome-shaped portion such that the first end of the truncated conical-shaped portion is external to an interior of the dome-shaped portion.

16. The device of claim 12, wherein the device is symmetric in three sections about a longitudinal axis of the device.

17. The non-return valve according to claim 12, wherein the sealing body consists of the domed shaped portion, the truncated cylindrical portion and at least three wings that guide the sealing body inside the valve sleeve.

18. A device, comprising:
a non-return valve including
a valve sleeve,
a valve seat,
a flow opening, and
a means for sealing, the means for sealing being moveable in the valve sleeve, the means for sealing comprising:
a dome-shaped portion having an outer surface defining a bulged sealing face, the dome-shaped portion having a maximum cross-sectional diameter at a base region of the dome-shaped portion; and
a truncated conical-shaped portion having a first end and a second end between the dome shaped portion and the first end, the second end having a cross-sectional diameter less than or equal to the maximum cross-sectional diameter of the dome-shaped portion, and the first end having a cross-sectional diameter less than the second end;
means for axially guiding the means for sealing in the valve sleeve so that at least a portion of the means for sealing always faces the valve seat; and
means for locking inserted into the valve sleeve through the flow opening and fixed therein, so that the means for locking restricts the movement of the means for sealing in the valve sleeve,
wherein the means for locking is retained in the valve sleeve by a means for retaining, the means for axially guiding guides the means for sealing in the valve seat so that a sealing face of the means for sealing always faces the valve seat and the a non-return valve is a means for preventing return of flow through the valve sleeve, and
wherein the sealing body comprises a plurality of wings arrayed about a longitudinal axis of the sealing body, the wings establishing the guiding means, the wings having a leading edge and a trailing edge, the trailing edge extending away from the first end of the truncated conical shaped portion and away from the longitudinal axis.

19. The non-return valve according to claim 18, wherein the first end of the truncated conical-shaped portion has a sidewall defining an opening of a cavity within the means for sealing.

20. The non-return valve according to claim 19, wherein a diameter of the cavity within the means for sealing uniform throughout the truncated conical-shaped portion of the means for sealing and tapered within the dome-shaped portion of the means for sealing.

21. The non-return valve according to claim 18, wherein the truncated conical-shaped portion extends in a direction away from the dome-shaped portion such that the first end of the truncated conical-shaped portion is external to an interior of the dome-shaped portion.

22. The device of claim 18, wherein:
the device is configured such that when the means for sealing is sealingly seated in the valve seat, the there is only one other opening that is open in the valve sleeve.

23. The device according to claim 18, wherein the device is configured such that the means for axially guiding the means for sealing comes into direct contact with the means for locking when restricting movement of the means for sealing in the valve sleeve, the restricting of movement being movement of the means for sealing in the axial direction, wherein when the valve is closed, the means for axially guiding is away from the means for locking.

24. The device of claim 18, wherein:
the valve sleeve is configured such that the valve seat is at the flow opening which comprises a first opening of the valve sleeve and a flow exit is at a second opening opposite the first opening and those are the only two openings of the valve sleeve between and inclusive of the first opening and the second opening.

25. The device of claim 18, wherein the valve sleeve is rotationally symmetric about a longitudinal axis of the device.

* * * * *